Nov. 8, 1927.
I. E. McCABE
1,648,414
PRESSURE OPERATED CIRCUIT CLOSER
Filed May 7, 1923　　2 Sheets-Sheet 1
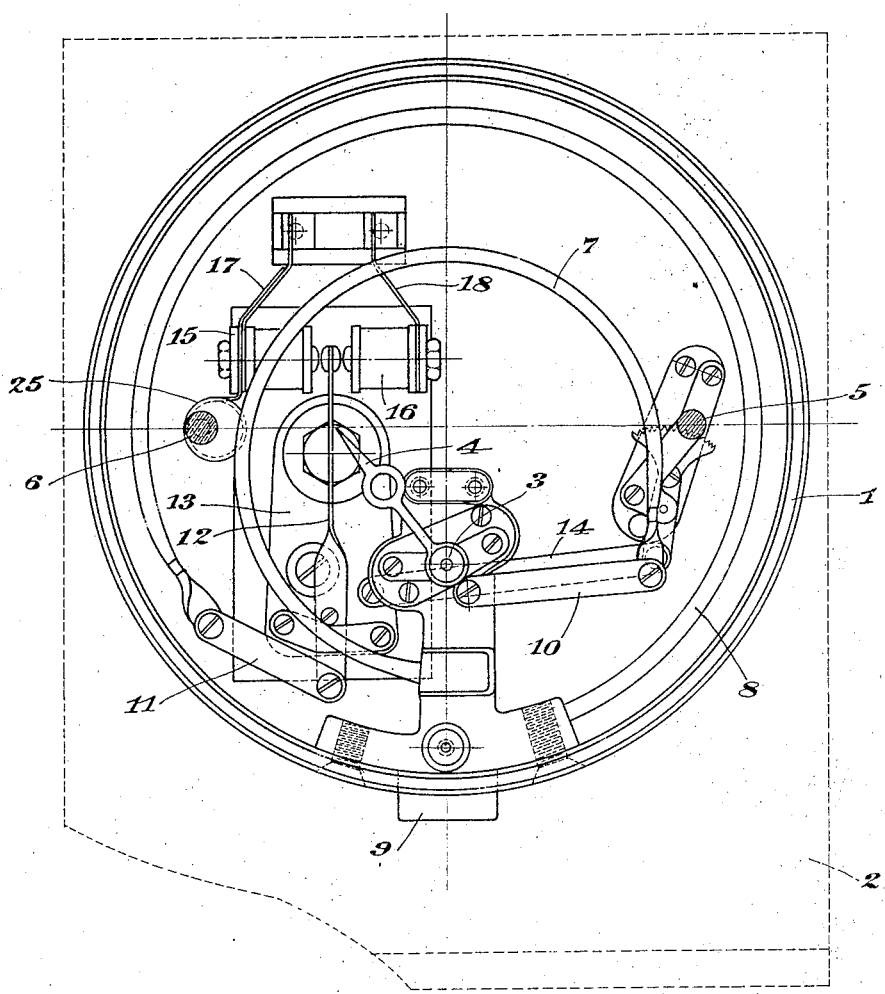
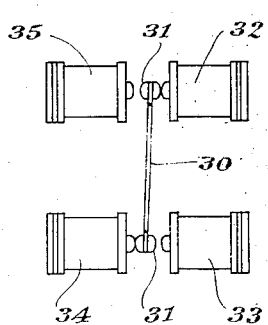
Fig. 1
Fig. 4
INVENTOR.
Ira E. McCabe
BY
Laughlin Moore
ATTORNEYS.

Nov. 8, 1927.  
I. E. McCABE  
1,648,414  
PRESSURE OPERATED CIRCUIT CLOSER  
Filed May 7, 1923  
2 Sheets-Sheet 2

INVENTOR.  
Ira E. McCabe  
BY  
ATTORNEYS.

Patented Nov. 8, 1927.

1,648,414

UNITED STATES PATENT OFFICE.

IRA E. McCABE, OF CHICAGO, ILLINOIS.

PRESSURE-OPERATED CIRCUIT CLOSER.

Application filed May 7, 1923. Serial No. 637,186.

This invention relates to improvements in automatic pressure control devices and more particularly to an electrically operated device of this character as applied to surgical appliances.

It is an object of this invention to provide a device of this character, for use in connection with the motor driven vacuum pump of a surgical appliance which necessitates the maintenance of a constant degree of vacuum, so that whenever the vacuum falls below the desired degree the pump is automatically operated until the desired degree is again obtained and then automatically disconnected. Appliances of this kind require very sensitive operating mechanism and likewise very sensitive control mechanism which will operate continuously for long periods at a time and it is a further object of this invention to provide an automatic control device which will fulfill these conditions and which does not require to be taken down and cleaned or adjusted between the periods of operation.

The advantages of such a control device are obvious. Furthermore a device constructed in accordance with this invention may be applied to control the degree of pressure as well as the degree of vacuum.

With these and other objects in view reference is made to the accompanying sheets of drawing in which like reference numerals indicate like parts. While the preferred form of this invention as applied to a vacuum control is illustrated, it is to be understood it may be applied to other uses and that minor changes may be made without departing from the scope thereof.

In the drawings:

Figure 1 is a view in front elevation of this improved automatic control device as employed in a surgical appliance for maintaining definite desired degrees of vacuum, with the front of the box of the appliance removed.

Figure 4 is a top plan view of a modified form of operating switch.

Figure 2:
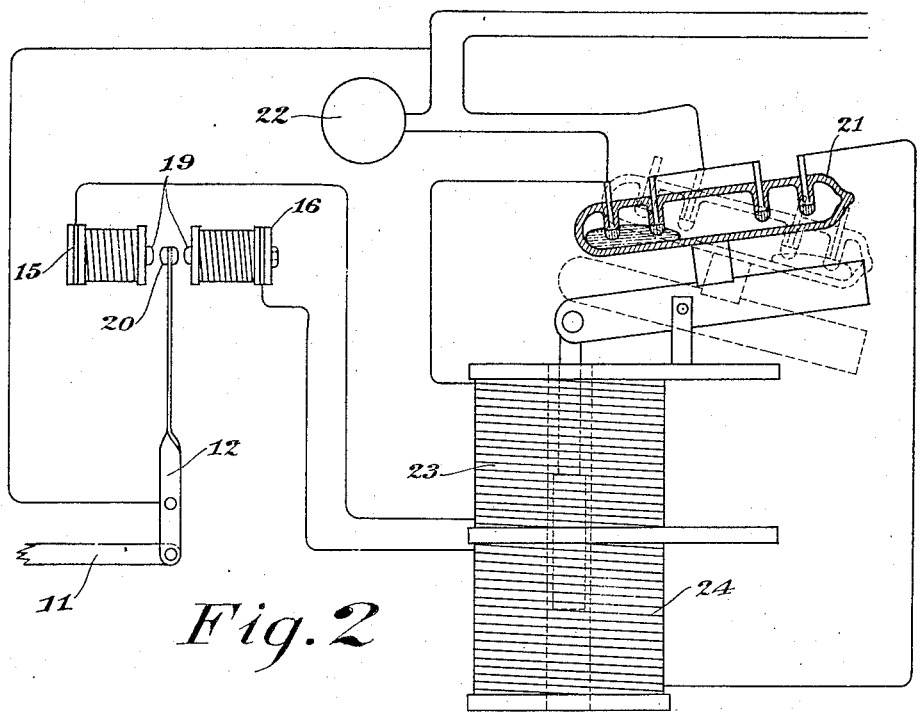
Figure 2 is a diagrammatical view of the electric circuits and elements.

While this invention is employed in connection with a surgical appliance, it does not relate to the details of the appliance, and they are therefore omitted from the drawings and need only to be described as being operated by an electric motor controlled by this improved device which is mounted in a casing 1 secured upon the inner side of the appliance containing box 2, through which projects a shaft 3 carrying an indicator hand 4 adapted to travel over a dial to indicate the degree of vacuum maintained and any variations therein, a vacuum adjustment shaft 5 and a range adjustment shaft 6 each having hand operating knobs on the exterior of the appliance box, the purpose of which will be described later.

Within the casing are mounted two Bourdon tubes extending from the same base in opposite directions with one 7 of less diameter than the other 8. The base of the two tubes is connected to the pump line 9 between the pump and the surgical appliance so that any change in degree of vacuum in the appliance is transmitted to the interior of the two tubes. The smaller tube 7 is connected at its free end by a link 10 to means to rotate the hand indicator shaft so that the hand 4 thereon will pass over a dial (not shown) to indicate each change in degree of the vacuum in the appliance. The outer and larger Bourdon tube 8 is connected at its free end by a pivoted link 11 to actuate a switch arm 12.

The switch arm 12 is pivotally connected at its lower end to the actuating link and is pivotally mounted a short distance thereabove upon an insulated plate 13 which in turn is pivoted at its upper end to the rear of the casing. The upper free end of the switch arm is provided with a contact on each side, which will be described later. The pivoted insulated plate 13 is connected by a link 14 pivoted at one side near the bottom of the plate to the vacuum adjustment shaft 5 through mechanism transmitting a movement of the shaft operating in either direction to swing the insulated plate about its pivot and thereby change the relations between the pivotal point of the switch arm and the free end of the outer Bourdon tube. On opposite sides of the free end of the switch arm 12 are mounted electromagnets 15 and 16 preferably by supporting spring strips 17 and 18 secured to the back of the casing. The core of each magnet is provided with a contact point 19 in line with the adjacent contact point 20 on the switch arm and each contact point on each core is connected to one terminal of the winding of each magnet.

Referring now to the diagrammatical view of the electric circuit for operating the motor for driving the pump, Figure 2, it will be seen that the current enters a tilting mercury tube two way switch 21 having terminals arranged in pairs at each end with the adjacent terminals of the pairs connected to each other and to the incoming line which in the position shown in full lines completes the circuit through the motor 22 and operates the pump. As the degree of vacuum is reached the outer Bourdon tube contracts and through the link at its free end throws the switch arm to bring its contact in engagement with the contact of the electro-magnet shown on the left. The terminal of the mercury switch connected to the motor is also connected to the windings of a solenoid 23 the other terminal of which is connected to the winding of the electro-magnet which in turn is connected to the core having the contact thereon in engagement with the contact on the switch arm. The switch arm is connected to the main circuit beyond the motor so that while the motor is operating, the closing of the circuit through the switch arm and solenoid will cause the retraction of the solenoid plunger which is connected to the tilting mercury switch and which will tilt the switch to break the circuit through the motor and at the same time break the circuit through the solenoid and electro-magnet. This position of the switch is shown in dotted lines. The outer terminal of the mercury switch now in the lowermost position will be connected to the source of current. This terminal is connected to the winding of a solenoid preferably arranged in line with and directly below the first solenoid and oppositely wound so that the same plunger may be employed and moved in the opposite direction when the latter solenoid 24 is energized. This solenoid is connected to the winding of the other electro-magnet, shown on the right of the switch arm, the winding of which is connected to the core having a contact point in line with the contact on that side of the switch arm. When the degree of vacuum drops below the desired degree the outer Bourdon tube expands and throws the switch arm to the right closing the circuit through the mercury tube, lower solenoid, electro-magnet and switch arm. The solenoid so energized will force the plunger upwards and tilt the mercury switch to the position shown in full lines and thereby break the circuit through the lower solenoid, electro-magnet and switch arm and at the same time close the circuit through the motor to operate the pump.

This operation occurs automatically and depends upon the frequency of the variations in the degrees of vacuum, which in most appliances of this kind is very often and is a constant intermittent action. The electro-magnets are preferably mounted on springs 17 and 18 to take up the shock of making contact by the swinging of the switch arm and to absorb any other vibrations to which the appliance may be subjected. The sensitiveness of the device depends upon the relations of the pivotal point of the switch arm and the free end of the Bourdon tube and also the relations between the contacts on the switch arm and electro-magnets. The relations between the Bourdon tube and switch arm are regulated by the vacuum adjustment knob and the relations between the switch arm contacts and electro-magnet contacts is adjusted by operation of the range adjustment knob which turns the range adjustment shaft 6 carrying a cam 25 adapted to engage the bottom 26 of the spring support of the left hand electro-magnet and adjust the range or distance the switch arm contact must travel to close the circuit through the electro-magnets.

Figure 3:
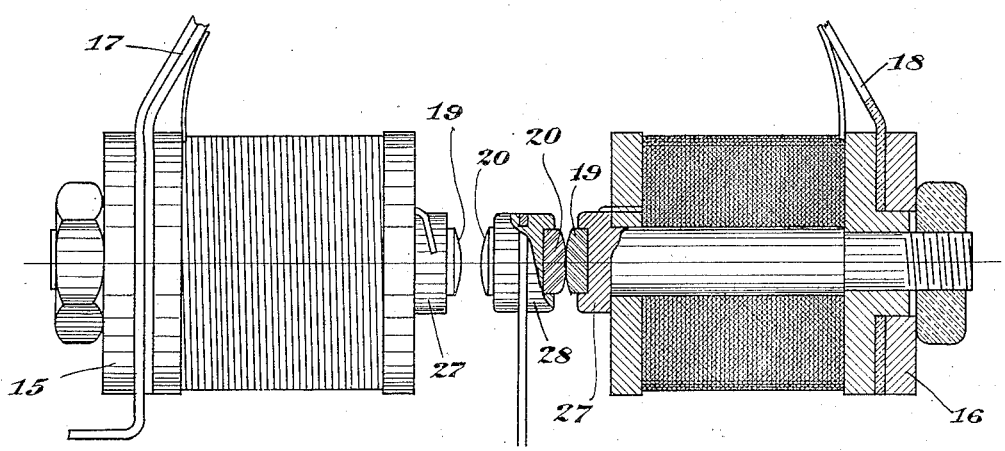
Figure 3 is an enlarged detail view in side elevation of the automatically controlled operating switch partly in section.

To produce a device sufficiently sensitive and yet positive and accurate in its operation a particular arrangement of contacts between the switch arm and electro-magnets is provided, as shown in detail in Figure 3. The core 27 of each electro-magnet is preferably of Norway iron and on the adjacent ends projecting slightly beyond the windings with the projecting portion of each core connected to one terminal of the winding of that respective magnet. In the head of each projecting core are welded oval faced contact points 19 of tungsten, platinum, silver or other suitable non-magnetic material. Contacts of non-magnetic material like that specified do not retain sufficient residual magnetism from the current passing therethrough to cause them to cling to each other and impair the prompt movement of the switch arm. A similar contact point 20 is welded on each side of a Norway iron rivet 28 passing through the free end of the switch arm in line with the electro-magnet contacts. When the switch arm is thrown by the Bourdon tube to close the circuit through either magnet the magnetized core attracts and holds the iron rivet of the switch arm with its contact in engagement at one point with the contact of that core. The contacts themselves are not magnetized and when the current is cut off the switch arm is free to move again without interference from magnetic forces. This arrangement prevents the forcing apart of the contacts by the resistance of the current passing therethrough and thereby the resulting arc which burns and corrodes the surfaces of the contacts. The oval heads of the contacts meet in the center of a magnetic field. They are held tightly together by their own completion of the circuit and do not chatter. Any arcing that occurs is forced outward in all directions by the influence of the magnetic field as well as the rising temperature at the arc thus insuring a clean surface at the point of contact at all times.

The circuit arrangement as described is such that the connection through the switch arm contacts is momentary but of sufficient duration to tilt the mercury tube in the opposite direction from which it is resting, opening the circuit through the switch arm contact. The amount of current for energizing the solenoids and passing through the switch arm may be very small and yet insure positive and long lived operation.

While the preferred arrangement of the circuits and elements therein has been shown and described, other elements may be employed such as electro-magnets for tilting the mercury tube switch, another form of mercury tube switch may be employed or the use of two mercury tube switches made for the making and breaking the circuit through the motor without departing from the scope of this invention.

Figure 4 illustrates a modification of the switch arm 12 and its contact points in the relay circuit. In this form the switch arm 30 is forked having spring metal arms with non-magnetic contact points 31 on each side held in Norway iron rivets, similar to those heretofore described, at the free end of each fork arm. This arrangement contemplates four electro-magnets 32, 33, 34 and 35, similar to magnets 15 and 16 heretofore described, so that when the switch arm is thrown by the Bourdon tube in one direction the relay circuit is closed through electro-magnets 32 and 33 and in the other direction through electro-magnets 34 and 35.

This arrangement with four electro-magnets includes two relay circuits, similar to that shown in Figure 2, in duplicate having one common switch arm. The forks of the switch arm being resilient, shown in the neutral position in Figure 4, a movement to the right will close the relay circuit through magnet 33, the relay circuit through magnet 32 being already closed, and a movement from the neutral to the left will close the relay circuit through magnet 35, the relay circuit through magnet 34 being closed. Magnets 32 and 35 are in one relay circuit while magnets 33 and 34 are in the other. It is understood that each relay circuit includes a separate and independent tilting switch and when the switch arm 30 is in the neutral position shown in Figure 4 one of the tilting switches will be in the position of the tilting switch shown in full lines in Figure 2, while the other will be in the position shown in dotted lines in this figure, so that upon energizing magnet 35 or magnet 33 the tilting switch in the relay circuit so closed will be tilted into the same position as the other and when both tilting switches are in the same position the motor will be either switched in or out of the main circuit as the case may be.

With this arrangement of relay circuits in duplicate, and proper connections between the tilting switches and the motor, the common switch arm will be able to control the starting, stopping or reversing of the motor, in other words, be able to control three movements.

If desired two separate tilting switches may be mounted on the same tilting device in which one is connected in the relay circuit and the other in the motor circuit permitting the use of currents of different voltages or sources.

What I claim is:

1. In a sensitive pressure operated electric switch mechanism, the combination with a source of pressure of a Bourdon tube adapted to be subjected to variations of pressure, a pivotally mounted electrical switch arm operatively connected to the Bourdon tube, electro-magnets resiliently supported on opposite sides of the free end of the switch arm, each having an electrical contact upon its core, an electrical contact on the switch arm adapted to engage one or the other of the first named contacts, each of said contacts having a contact point of non-magnetic material, whereby when the circuit is completed, the magnetic contact points meet in the center of a magnetic field.

2. In a sensitive pressure operated electric switch mechanism, the combination with a source of pressure of a Bourdon tube adapted to be subjected to variations of pressure, a pivotally mounted electrical switch arm operatively connected to the Bourdon tube, electro-magnets resiliently supported on opposite sides of the free end of the switch arm, each having a core forming one terminal of its winding, an electrical contact passing through the free end of the switch arm adapted to engage one or the other of the magnetic cores to complete the circuit therethrough, the engaging portions of the respective cores and switch arm contact each provided with an oval-faced non-magnetic contact point which meet, when the circuit is completed, in the center of a magnetic field, whereby the effects of arcing are forced outward by the magnetic field and clean contact points are assured.

3. In a sensitive pressure operated electric switch mechanism, the combination with a source of pressure of a plurality of Bourdon tubes adapted to be simultaneously subjected to the same variations of pressure, a pressure indicator having an operative connection with one Bourdon tube, an electric switch arm pivotally mounted intermediate its length on an adjustable plate, means for adjusting said plate, an operative connection between the other Bourdon tube and the lower free end of the switch arm, electromagnets having cores forming one terminal of their winding resiliently supported on opposite sides of the upper free end of the switch arm, a contact mounted upon said end of the switch arm adapted to engage one core or the other means for adjusting the relays of a resiliently supported magnet and the switch arm contact, each core and each side of the switch arm contact respectively provided with an oval-faced non-magnetic contact point, whereby the variations of pressure are indicated and simultaneously break the circuit through one magnet and the switch arm, while closing the circuit through the other magnet and the switch arm during which later operations the said non-magnetic contact point meet in the center of a magnetic field, which holds the contacts firmly without chattering and dissipates the effect of arcing in all directions, thereby assuring clean surfaces of the contact points.

IRA E. McCABE.